(12) United States Patent
Kim et al.

(10) Patent No.: US 12,368,210 B2
(45) Date of Patent: Jul. 22, 2025

(54) FIRE SAFETY SYSTEM FOR MOBILITY

(71) Applicants: Hyundai Motor Company, Seoul (KR); Kia Corporation, Seoul (KR)

(72) Inventors: Jong Won Kim, Cheonan-si (KR); Youn Sic Nam, Daejeon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 293 days.

(21) Appl. No.: 17/861,410

(22) Filed: Jul. 11, 2022

(65) Prior Publication Data
US 2023/0052320 A1   Feb. 16, 2023

(30) Foreign Application Priority Data
Aug. 10, 2021   (KR) .................. 10-2021-0105576

(51) Int. Cl.
| | |
|---|---|
| H01M 10/613 | (2014.01) |
| A62C 3/16 | (2006.01) |
| A62C 37/11 | (2006.01) |
| F25B 45/00 | (2006.01) |
| H01M 10/48 | (2006.01) |
| H01M 10/63 | (2014.01) |

(Continued)

(52) U.S. Cl.
CPC ............ H01M 50/383 (2021.01); A62C 3/16 (2013.01); A62C 37/11 (2013.01); F25B 45/00 (2013.01); H01M 10/482 (2013.01); H01M 10/486 (2013.01); H01M 10/613 (2015.04); H01M 10/63 (2015.04); H01M 10/6567 (2015.04); H01M 10/663 (2015.04); H01M 2200/10 (2013.01)

(58) Field of Classification Search
CPC .. H01M 50/383; H01M 10/613; H01M 10/63; H01M 10/6567; H01M 10/663; H01M 10/482; H01M 10/486; H01M 2200/10; A62C 3/16; A62C 37/11; F25B 45/00
See application file for complete search history.

(56) References Cited

U.S. PATENT DOCUMENTS

| | | | |
|---|---|---|---|
| 2011/0200860 A1* | 8/2011 | Brodie | .................. B60L 1/003 429/120 |
| 2018/0212287 A1* | 7/2018 | Hong | .................. B62D 25/08 |

(Continued)

FOREIGN PATENT DOCUMENTS

| | | |
|---|---|---|
| KR | 200385997 Y1 | 6/2005 |
| KR | 2020150003540 U | 9/2015 |

(Continued)

*Primary Examiner* — James Lee
(74) *Attorney, Agent, or Firm* — Slater Matsil, LLP (57) ABSTRACT

An embodiment fire safety system for a mobility includes an air conditioner system including a compressor, a condenser, an expander, and an evaporator, wherein the air conditioner system is configured to circulate a refrigerant through the compressor, the condenser, the expander, and the evaporator, a battery pack including a battery and a temperature sensor, a refrigerant injector installed in the battery pack and coupled to the air conditioner system, and a controller configured to control the refrigerant injector to selectively inject the refrigerant into the battery in response to a temperature of the battery measured by the temperature sensor being equal to or greater than a temperature threshold.

20 Claims, 5 Drawing Sheets

(51) Int. Cl.
*H01M 10/6567* (2014.01)
*H01M 10/663* (2014.01)
*H01M 50/383* (2021.01)

(56) References Cited

U.S. PATENT DOCUMENTS

| | | | | |
|---|---|---|---|---|
| 2018/0370013 | A1* | 12/2018 | Munevar | H01M 10/659 |
| 2021/0013559 | A1* | 1/2021 | Lee | B60L 53/18 |
| 2021/0359353 | A1* | 11/2021 | Dunn | H01M 10/6556 |
| 2022/0407145 | A1* | 12/2022 | Devarakonda | H01M 10/6557 |
| 2023/0029384 | A1* | 1/2023 | Zhao | H01M 10/663 |

FOREIGN PATENT DOCUMENTS

| | | |
|---|---|---|
| KR | 102143351 B1 | 8/2020 |
| KR | 20200112461 A | 10/2020 |

* cited by examiner

FIRE SAFETY SYSTEM FOR MOBILITY

CROSS-REFERENCE TO RELATED APPLICATIONS

This application claims the benefit of Korean Patent Application No. 10-2021-0105576, filed on Aug. 10, 2021, which application is hereby incorporated herein by reference.

TECHNICAL FIELD

The present invention relates to a fire safety system for a mobility.

BACKGROUND

Recently, a mobility that can be used in various fields such as cargo containers and medical transportation is under development, and the mobility with energy efficiency and stabilization has been developed and is reaching the commercialization stage.

Such mobility is driven using the power stored in a battery, and in the case of the battery, there is a risk of fire due to the driving characteristics. However, in the mobility that is electrically driven using the power of the battery, technology development is focused on the method for improving the efficiency of power energy.

That is, a conventional mobility has a problem in that a method for extinguishing a battery fire is not provided in the occurrence of the battery fire.

In addition, when the battery fire occurs in the mobility, thermal runaway phenomenon occurs due to the characteristics of the battery and ignition starts rapidly. However, the fire caused by the battery has not been solved, although there are some methods such as a method of blocking oxygen or lowering an activation energy by an electrochemical reaction by a large-capacity fire extinguisher or spraying inert liquid.

As such, when a fire occurs in the battery, it is difficult to extinguish the fire, so a fire extinguishing device is required in the occurrence of the battery fire.

The matters described as the background art above are only for improving the understanding of the background of the present invention, and should not be accepted as acknowledging that they correspond to the prior art already known to those of ordinary skill in the art.

SUMMARY

The present invention relates to a fire safety system for a mobility. Particular embodiments relate to a fire safety system for a mobility that is capable of blocking a fire in a battery cell by using a refrigerant in case of a battery fire.

Embodiments of the present invention can solve problems in the prior art, and an embodiment of the present invention provides a fire safety system for a mobility that is capable of securing fire safety through efficient fire suppression of a battery fire in a mobility driven by battery power.

A fire safety system for a mobility according to embodiments the present invention includes an air conditioner module including a compressor, a condenser, an expander, and an evaporator through which refrigerant is circulated, a battery pack including a battery module and a temperature sensor to measure a temperature of the battery module, a refrigerant injector that is installed in the battery pack, shares the refrigerant from the air conditioner module, and is configured to selectively inject the refrigerant to the battery module, and a controller that controls the refrigerant injector to inject the refrigerant into the battery module when the temperature sensor inputs the temperature of the battery module equal to or greater than a set temperature (i.e., a temperature threshold).

The battery pack is provided with an inner space in which the battery pack module is provided, and a discharge passage communicating from the inner space to an outside, and the discharge passage is provided with an adjustment valve to selectively open and close the discharge passage.

The refrigerant injector includes a refrigerant supply line that extends from the battery module inside the battery pack in the air conditioner module, and an injection unit that is installed on the refrigerant supply unit to match the battery module and is configured to be opened and closed according to control of the controller.

The injection unit includes a cap part that communicates with the refrigerant supply line, a sealing part that is filled in the cap part to seal the cap part and is melted at a specific temperature, and a heat generation part that is provided in contact with the sealing part in the cap part and is configured to generate heat according to the control of the controller.

The injection unit includes an opening part in the refrigerant supply line that is opened toward the battery module, a bimetal part that is installed in the opening part to close the opening part and is deformed in response to occurrence of a specific temperature to open the opening part, and a heating part that is provided in contact with the bimetal part and is heated according to the control of the controller.

The battery pack is provided with a plurality of the battery modules and a plurality of temperature sensors to measure temperatures of the respective battery modules, the refrigerant supply line is extended to pass through the respective battery modules, a plurality of the injection units is installed to match the respective battery modules, and the controller controls the injection unit matched to the battery module having a temperature equal to or greater than a set temperature among the plurality of battery modules to be opened.

The refrigerant supply line is connected to be supplied with the refrigerant that has passed through the expander in the air conditioner module.

The air conditioner module further includes a refrigerant storage in which the refrigerant that has passed through the condenser is stored, and the refrigerant in the refrigerant storage is supplied to the refrigerant supply line through the expander in response to the control of the controller.

The controller further receives a remaining amount of battery charge, and allows the refrigerant to be stored in the refrigerant storage in the air conditioner module when the remaining amount of battery charge is equal to or greater than a set remaining amount.

The air conditioner module is further provided with a measurement unit to check a refrigerant capacity, and the controller receives information on the refrigerant capacitor by the measurement unit, and allows the refrigerant to be stored in the refrigerant storage in the air conditioner module when the refrigerant capacity is equal to or less than a set capacity.

When the temperature of the battery module is equal to or greater than the set temperature, the controller controls the air conditioner module to stop driving for indoor cooling or heating.

The fire safety system for a mobility having the structure as described above blocks the increase in activation energy of an electrochemical reaction by injecting a refrigerant in an air conditioner module in whole or in part in a battery module when a fire occurs in the battery, and maintains the temperature of the battery below an ignition point, so that the fire safety of the battery is secured by blocking chain ignition through oxygen blocking.

DETAILED DESCRIPTION OF ILLUSTRATIVE EMBODIMENTS

Hereinafter, a fire safety system for a mobility according to a preferred embodiment of the present invention will be described with reference to the accompanying drawings.

Figure 1:
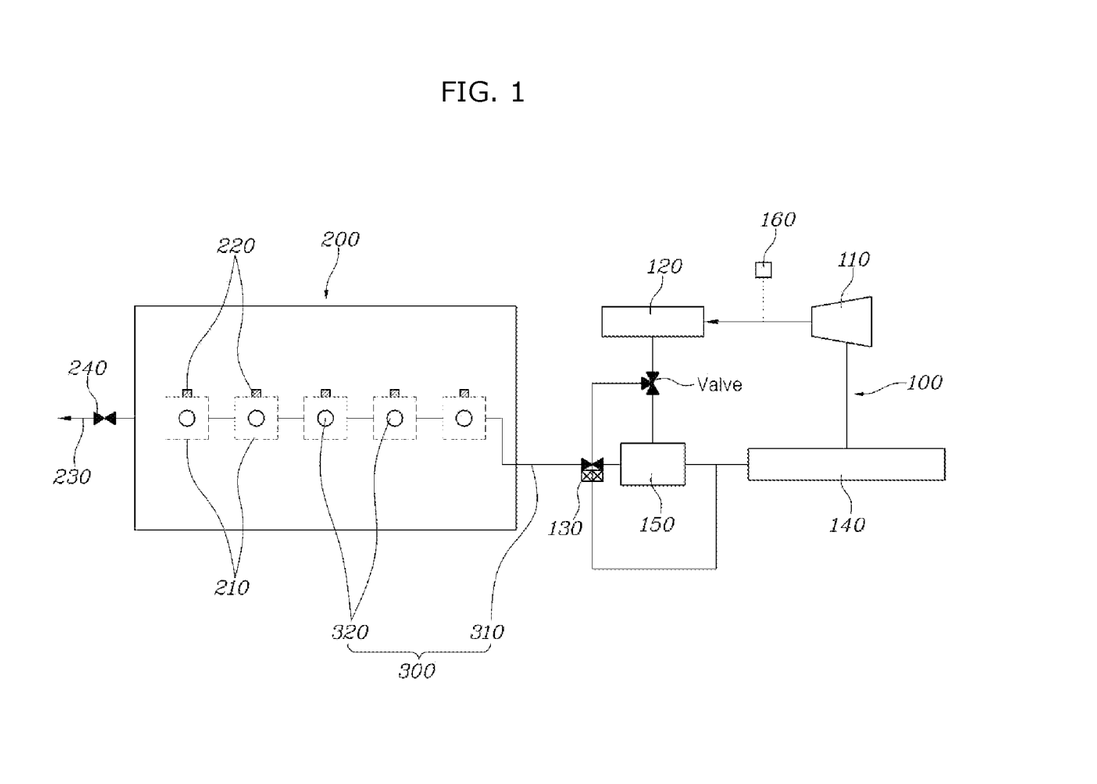
FIG. 1 is a block diagram of a fire safety system for a mobility according to an embodiment of the present invention.
Figure 2:
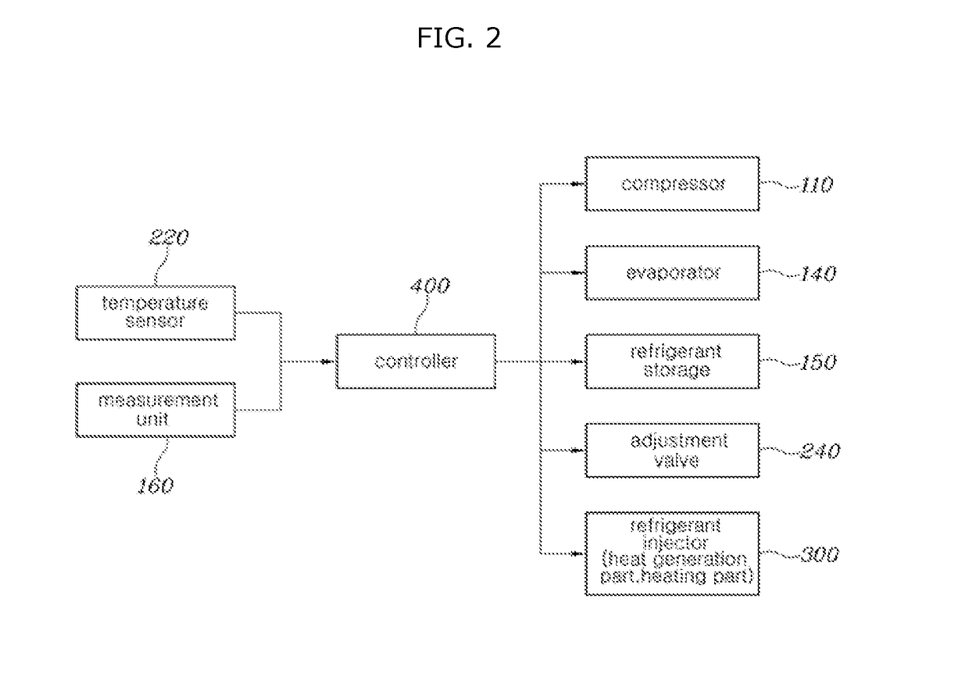
FIG. 2 is a control configuration diagram of the fire safety system for the mobility shown in FIG. 1.
Figure 3:
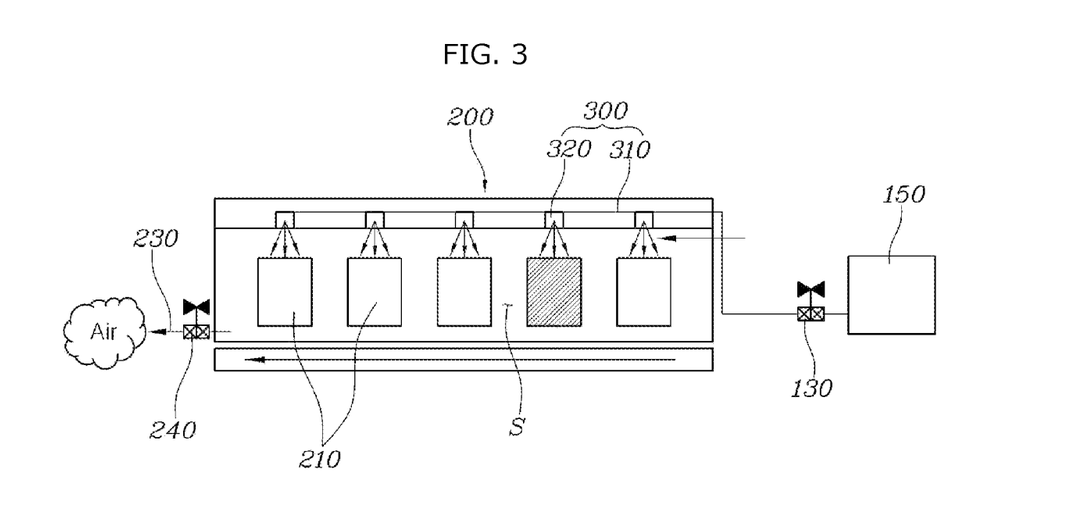
FIG. 3 is a view for explaining the fire safety system for the mobility shown in FIG. 1.

FIG. 1 is a block diagram of a fire safety system for a mobility according to an embodiment of the present invention, FIG. 2 is a control configuration diagram of the fire safety system for the mobility shown in FIG. 1, and FIG. 3 is a view for explaining the fire safety system for the mobility shown in FIG. 1.

Figure 4:
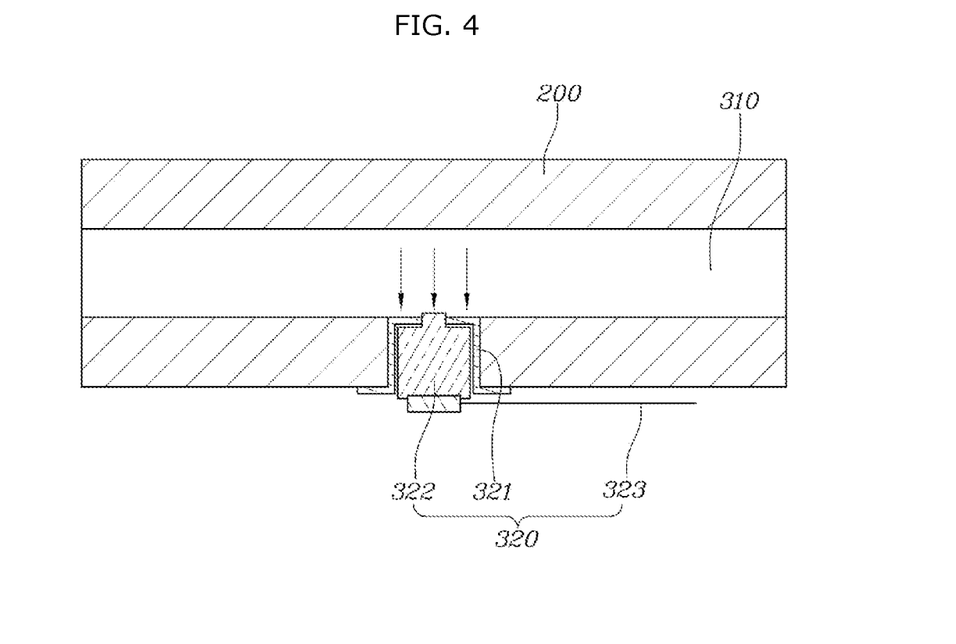
FIG. 4 is a view showing an injection unit according to an embodiment of the present invention.
Figure 5:
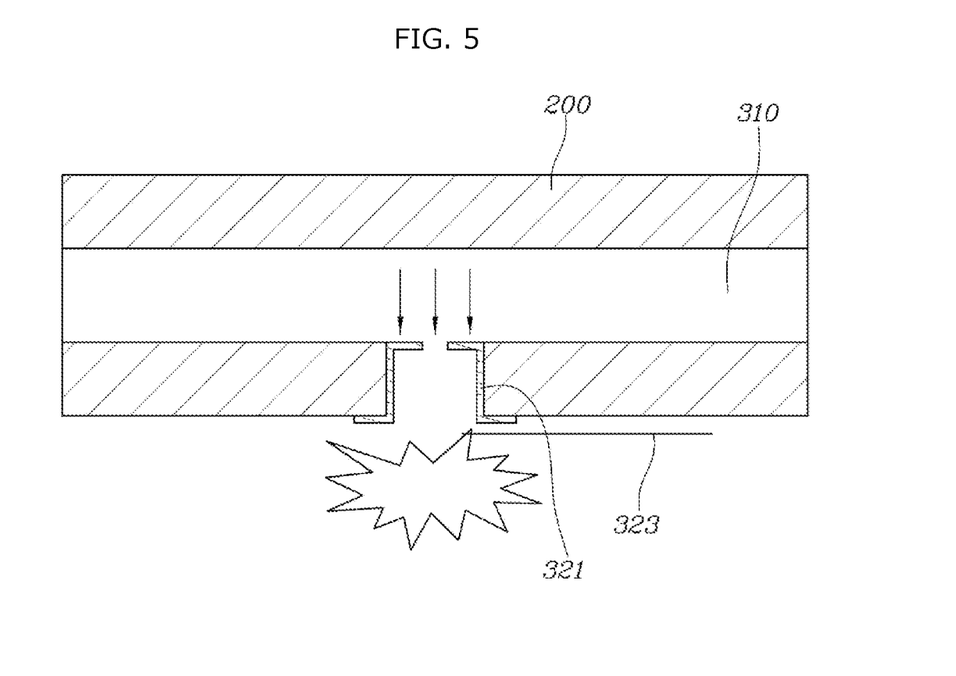
FIG. 5 is a view showing the operation of the injection unit shown in FIG. 4.
Figure 6:
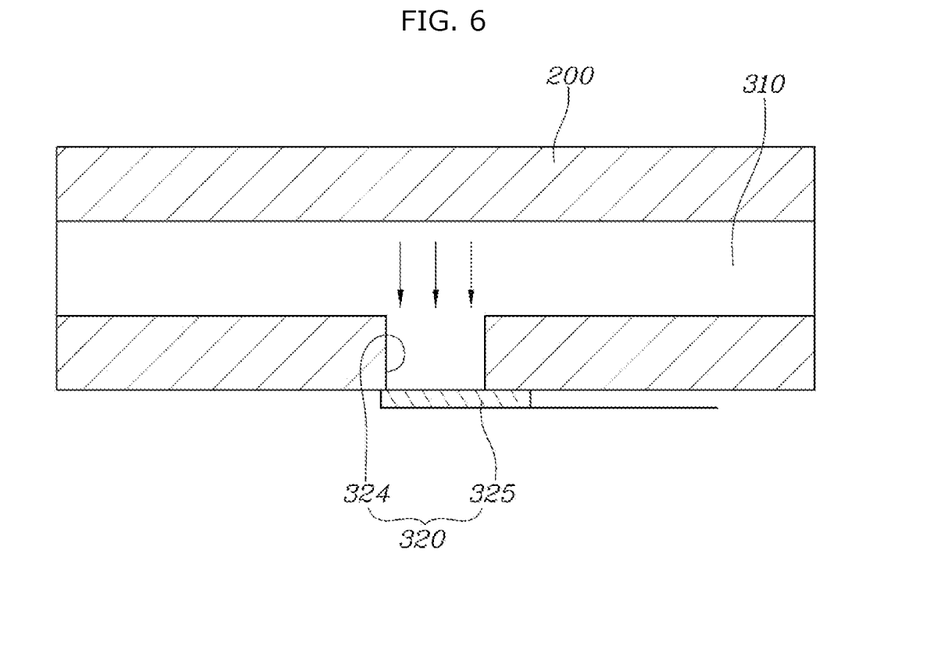
FIG. 6 is a view showing an injection unit according to an embodiment of the present invention.
Figure 7:
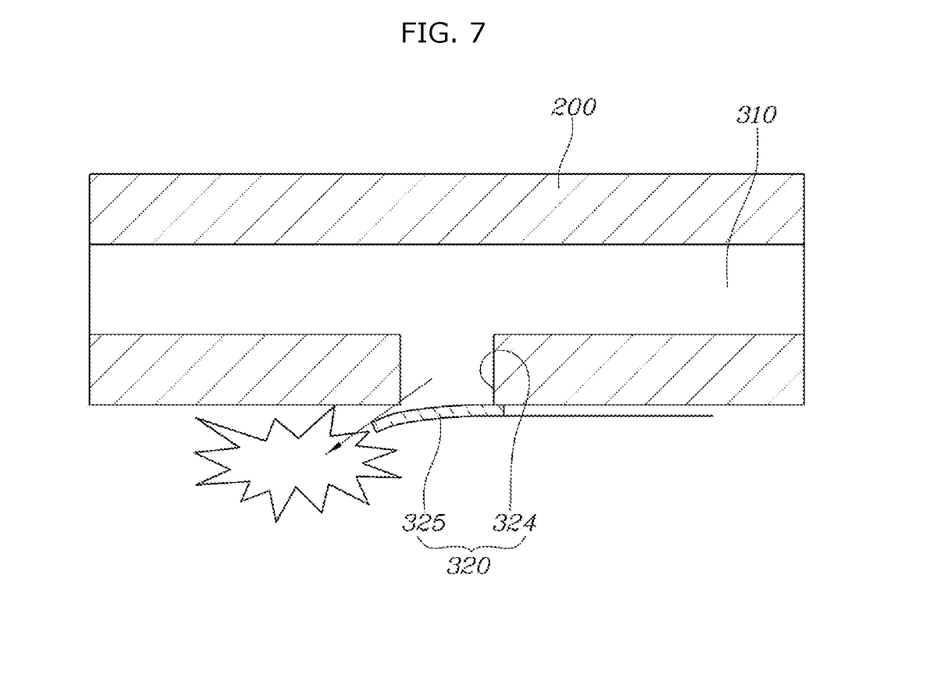
FIG. 7 is a view showing the operation of the injection unit shown in FIG. 6.

In addition, FIG. 4 is a view showing an injection unit according to an embodiment of the present invention, FIG. 5 is a view showing the operation of the injection unit shown in FIG. 4, FIG. 6 is a view showing an injection unit according to an embodiment of the present invention, and FIG. 7 is a view showing the operation of the injection unit shown in FIG. 6.

Figure 8:
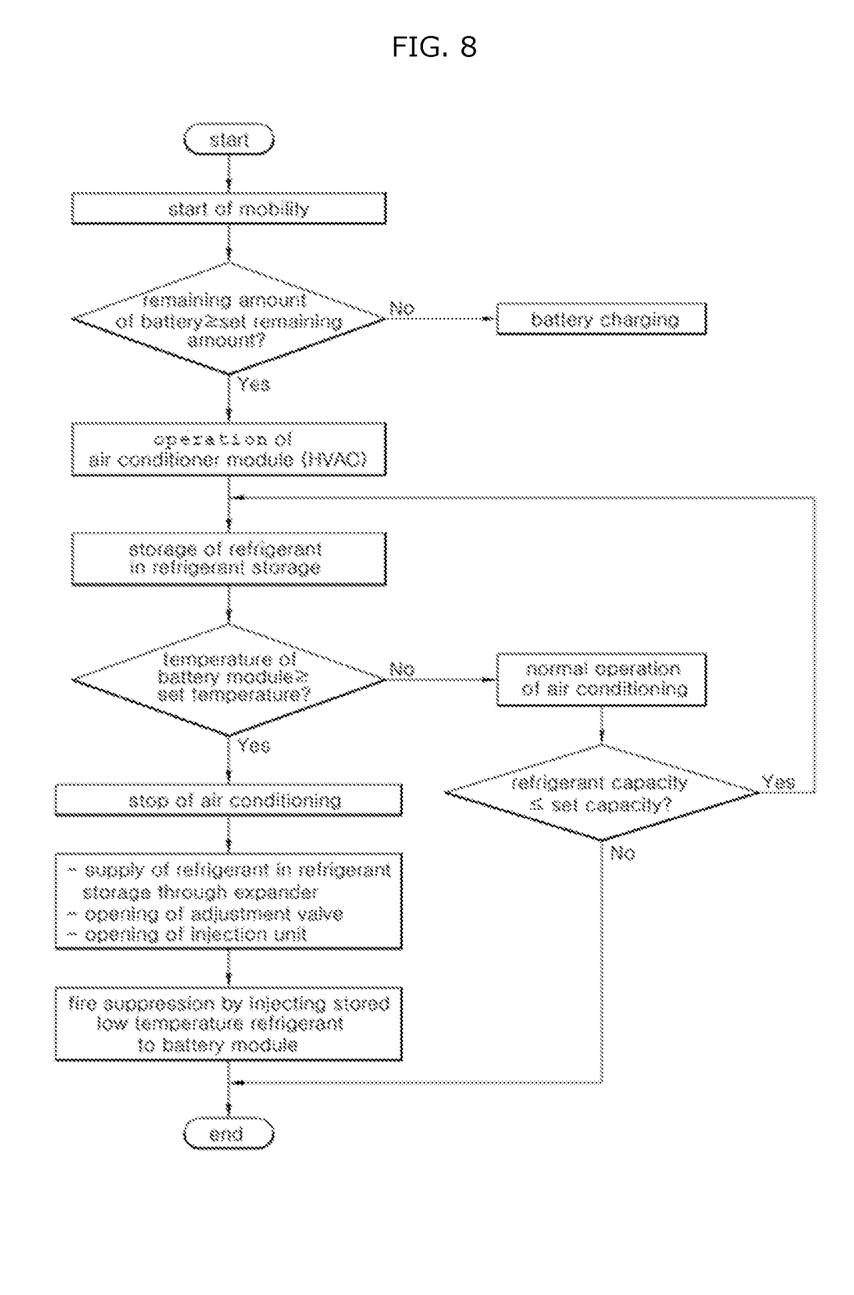
FIG. 8 is a control flowchart of a fire safety system for a mobility according to an embodiment of the present invention.

FIG. 8 is a control flowchart of a fire safety system for a mobility according to an embodiment of the present invention.

As shown in FIGS. 1 to 3, a fire safety system for a mobility according to embodiments of the present invention includes an air conditioner module 100 including a compressor 110, a condenser 120, an expander 130, and an evaporator 140 through which refrigerant is circulated, a battery pack 200 including a battery module 210 and a temperature sensor 220 to measure the temperature of the battery module 210, a refrigerant injector 300 that is installed in the battery pack 200, shares the refrigerant from the air conditioner module 100, and is configured to selectively inject the refrigerant to the battery module 210, and a controller 400 that controls the refrigerant injector 300 to inject the refrigerant into the battery module 210 when the temperature sensor 220 inputs the temperature of the battery module 210 as equal to or greater than a set temperature.

The air conditioner module 100 is configured to cool indoor or outdoor air and provide it to an indoor space by circulating refrigerant through the compressor no, the condenser 120, the expander 130, and the evaporator 140.

In addition, one embodiment of the present invention may include a heat pump in which the refrigerant circulated in the air conditioner module 100 and the coolant circulated in a coolant line circulated for cooling a battery and a coolant line circulated for cooling an electronic module exchange heat. Accordingly, the air conditioner module 100 may further include a heat exchanger, an expansion valve, and the like.

The battery pack 200 includes the battery module 210 and the temperature sensor 220 to measure the temperature of the battery module 210. A plurality of battery modules 210 may be provided in the battery pack 200, and when the plurality of battery modules 210 is provided, the temperature sensor 220 is also composed of a plurality and the temperature sensors 220 measure the temperatures of the respective battery modules 210.

In particular, in embodiments of the present invention, the refrigerant injector 300 is installed in the battery pack 200. The refrigerant from the air conditioner module 100 is shared with the refrigerant injector 300 and the refrigerant injector 300 is configured to selectively inject the refrigerant to the battery module 210, so that the extinguishing of the battery module 210 having a risk of fire can be performed when the refrigerant circulated in the air conditioner module 100 is injected into the battery pack 200.

The refrigerant injector 300 is controlled by the controller 400 to selectively inject the refrigerant into the battery pack 200. That is, the controller 400 receives the temperature information of the battery module 210 through the temperature sensor 220, and determines that a fire occurs in the battery module 210 when it is input that the temperature of the battery module 210 is equal to or greater than a set temperature. Accordingly, the controller 400 controls the refrigerant injector 300 to inject the refrigerant into the battery module 210, so that the temperature of the battery module 210 having a risk of fire is reduced. In addition, as the refrigerant is injected into the battery module 210, oxygen is blocked by the refrigerant in the corresponding battery module 210 to prevent chain ignition.

When describing in detail embodiments of the present invention described above, as shown in FIG. 3, the battery pack 200 is provided with an inner space S in which the battery pack 200 module is provided, and a discharge passage 230 communicating from the inner space S to an outside. The discharge passage 230 is provided with an adjustment valve 240 that selectively opens and closes the discharge passage 230.

That is, the battery pack 200 is provided with the battery module 210 in the inner space S, and the adjustment valve 240 is provided in the discharge passage 230 and communicated from the inner space S to the outside. Thus, the inner space S of the battery pack 200 and the outside are selectively communicated according to whether the adjustment valve 240 is opened or closed.

Accordingly, when the refrigerant injector 300 injects the refrigerant into the inner space S of the battery pack 200 under the control of the controller 400, the adjustment valve 240 is also controlled to be opened so that the oxygen remaining in the inner space S is discharged to the outside through the discharge passage 230. At the same time, as the refrigerant is filled in the inner space S of the battery pack 200, oxygen is blocked and the battery module 210 is extinguished. In addition, when fire extinguishing according to the fire of the battery module 210 is performed, the fire impurities including the refrigerant in the inner space S are discharged to the outside through the discharge passage 230.

The adjustment valve 240 may be opened and closed under the control of the controller 400. In addition, the inner space S of the battery pack 200 is configured to be partitioned for each battery module 210, so that the fire extinguishing of each battery module 210 is performed individually, and the oxygen discharge according to refrigerant injection and the discharge of the refrigerant and fire impurities can be performed individually.

On the other hand, the refrigerant injector 300 includes a refrigerant supply line 310 that extends from the battery module 210 inside the battery pack 200 in the air conditioner module 100, and an injection unit 320 that is installed on the refrigerant supply line 310 to match the battery module 210 and is configured to be opened and closed according to the control of the controller 400.

As such, the refrigerant injector 300 is composed of the refrigerant supply line 310 and the injection unit 320, and the refrigerant supply line 310 branches from the air conditioner module 100 and extends to the battery module 210 so that the refrigerant circulating in the air conditioner module 100 is shared. Here, the injection unit 320 is installed on the refrigerant supply line 310 while matching the battery module 210 so that the refrigerant is injected toward the battery module 210.

In addition, the refrigerant supply line 310 is disposed on the upper side of the battery module 210 in the battery pack 200, and the injection unit 320 is installed to be sprayed downward toward the battery module 210, so that when the fire of the battery module 210 occurs, the battery module 210 is efficiently extinguished by the refrigerant injected through the injection unit 320.

The above-described injection unit 320 may be applied in various embodiments.

As an embodiment according to the injection unit 320, as shown in FIGS. 4 to 5, the injection unit 320 may include a cap part 321 that communicates with the refrigerant supply line 310, and a sealing part 322 that is filled inside of the cap part 321 and is melted at a specific temperature, and a heat generation part 323 that is provided in contact with the sealing part 322 in the cap part 321 and is configured to generate heat according to the control of the controller 400.

That is, the injection unit 320 includes the cap part 321, the sealing part 322, and the heat generation part 323. As the sealing part 322 is filled inside the cap part 321 that is installed in the battery pack 200 and communicates with the refrigerant supply line 310, the flow of the refrigerant through the cap part 321 is blocked. Here, the sealing part 322 may be made of white metal that is melted when a specific temperature is reached.

In addition, the cap part 321 is provided in contact with the sealing part 322, and the heat generation part 323 which generates heat in response to the control of the controller 400 is installed. For this reason, as can be seen in FIG. 4, as the sealing part 322 filled in the cap part 321 seals the cap part 321 in a normal situation, the refrigerant in the refrigerant supply line 310 is not flowed in the inner space S of the battery pack 200. Here, as shown in FIG. 5, when the controller 400 determines that a fire has occurred in the battery module 210, the heat generation part 323 is operated so that the sealing part is melted as the heat generation part 323 is heated up to the melting temperature of the sealing part 322. Thus, the cap part 321 is opened by melting of the sealing part 322, so that the refrigerant in the refrigerant supply line 310 is injected into the inner space S of the battery pack 200 through the cap part 321, and the extinguishment of the battery module 210 with fire risk is performed.

On the other hand, as another embodiment according to the injection unit 320, as shown in FIGS. 6 to 7, the injection unit 320 includes an opening part 324 in the refrigerant supply line 310 that is opened toward the battery module 210, a bimetal part 325 that is installed in the opening part 324 and is deformed in response to the occurrence of a specific temperature to open the opening part 324, and a heating part 326 that is provided in contact with the bimetal part 325 and is heated by the control of the controller 400.

That is, the injection unit 320 includes the opening part 324, the bimetal part 325, and the heating part 326, and the opening part 324 which is opened in the battery pack 200 and is communicated with the refrigerant supply line 310 is closed by the bimetal part 325 to block the flow of the refrigerant. Here, the bimetal part 325 may be made of a shape-memory alloy that is deformed when a specific temperature is reached.

In addition, the heating part 326 that is provided in contact with the bimetal part 325 and generates heat according to the control of the controller 400 is installed in the battery pack 200. Therefore, as can be seen in FIG. 6, the bimetal part 325 normally maintains its initial shape and closes the opening part 324, and thus, the refrigerant in the refrigerant supply line 310 is not flowed into the inner space S of the battery pack 200. Here, as shown in FIG. 7, when the controller 400 determines that fire has occurred in the battery module 210, the heating part 326 is operated, so that as the heating part 326 is heated up to the deformation temperature of the bimetal 325, the bimetal part 325 is deformed in the direction of opening the opening part 324. Accordingly, the refrigerant in the refrigerant supply line 310 is injected into the inner space S of the battery pack 200 through the opening part 324 to extinguish the battery module 210 with fire risk.

Meanwhile, in embodiments of the present invention, a plurality of battery modules 210 and a plurality of temperature sensors 220 may be provided in the battery pack 200. Accordingly, the refrigerant supply line 310 extends to pass through the respective battery modules 210, and the injection unit 320 is composed of a plurality and the injection units 320 are installed to match the respective battery modules 210. That is, the refrigerant supply line 310 is extended from each air conditioner module 100 and then is branched inside the battery pack 200 and is extended to the respective battery modules 210, and the injection unit 320 is installed to match the respective battery modules 210, so that when a fire occurs in each of the plurality of battery modules 210, it is possible to extinguish the fire accordingly.

Accordingly, the controller 400 receives temperature information from each temperature sensor 220 that measures the temperature of each battery module 210, and among the plurality of battery modules 210, the injection unit 320 matching the battery module 210 whose temperature is equal to or greater than the set temperature is controlled to be opened. Therefore, even if the battery module 210 is composed of a plurality, it is possible to individually respond to the fire occurrence for each battery module 210.

Meanwhile, as shown in FIG. 1, the refrigerant supply line 310 may be connected to be supplied with the refrigerant that has passed through the expander 130 in the air conditioner module 100.

That is, the refrigerant circulates through the compressor 110, the condenser 120, the expander 130, and the evaporator 140 in the air conditioner module 100, and in the case of the fire occurrence of the battery module 210, the refrigerant should be in an advantageous state to suppress the fire. Accordingly, the refrigerant supply line 310 is connected after the expander 130 in the air conditioner module 100 in which the refrigerant is converted to low temperature and low pressure, and receives the refrigerant of low temperature and low pressure that has passed through the expander 130. Therefore, in the battery module 210 in which the fire has occurred, the temperature of the battery module 210 is maintained below the ignition point by the low-temperature refrigerant, and oxygen is blocked by the low-pressure refrigerant to block chain ignition.

Here, the refrigerant supply line 310 may be connected to a separate expansion valve when the heat pump is applied. That is, the refrigerant supply line 310 is configured to receive the expanded refrigerant and inject the refrigerant of low temperature and low pressure to the battery module 210, so that the effective extinguishment of the battery module 210 can be performed.

Meanwhile, the air conditioner module 100 may further include a refrigerant storage 150 in which the refrigerant that has passed through the condenser 120 is stored. That is, the refrigerant storage 150 stores the refrigerant of low temperature and high pressure that has passed through the condenser 120, so that the refrigerant can be quickly provided according to the control of the controller 400 due to the occurrence of a fire.

That is, when it is confirmed that a fire in the battery module 210 will occur, the controller 400 causes the refrigerant in the refrigerant storage 150 to pass through the expander 130 to be supplied to the refrigerant supply line 310. Accordingly, a separate valve operated under the control of the controller 400 may be further provided in the refrigerant storage 150. In addition, the refrigerant supplied from the refrigerant storage 150 may be selectively supplied to the refrigerant supply line 310 by controlling the opening and closing of an expansion valve.

Here, the controller 400 causes the refrigerant that has passed through the condenser 120 to be stored in the refrigerant storage 150 at the initial start-up of the mobility, so that when the mobility is started and uses the power of the battery pack 200, the immediate response to the fire in the battery pack 200 is performed.

In addition, the controller 400 further receives the information on a remaining amount of battery charge, and when the remaining amount of battery charge is equal to or greater than a set remaining amount, the refrigerant is stored in the refrigerant storage 150 of the air conditioner module 100.

That is, the controller 400 receives the information on the remaining amount of battery charge, and causes to store the refrigerant in the refrigerant storage 150 of the air conditioner module 100 when the remaining amount of battery charge is equal to or greater than the set remaining amount, thereby immediately responding to the fire in the battery pack 200. That is, if the remaining amount of battery charge is equal to or greater than the set remaining amount, fire risk may occur when the battery module 210 is operated, so that the refrigerant is stored in the refrigerant storage 150 to respond with the fire in the battery module 210.

If the remaining amount of the battery is less than the set remaining amount, the driving condition of the mobility is limited, and the high-output operation of the battery module 210 is restricted, so that the fire risk is reduced. Accordingly, the controller 400 induces charging of the battery when the remaining amount of battery charge is less than the set remaining amount.

On the other hand, the air conditioner module 100 is further provided with a measurement unit 160 that measures a refrigerant capacity. The measurement unit 160 is configured as a sensor for directly checking the capacity of the refrigerant circulated in the air conditioner module 100 or a sensor for measuring the pressure of the refrigerant, so that the refrigerant capacity can be determined.

The controller 400 receives information on the refrigerant capacity through the measurement unit 160, and when the refrigerant capacity is equal to or less than a set capacity, the refrigerant is stored in the refrigerant storage 150 of the air conditioner module 100.

Here, the set capacity may be set as the refrigerant capacity required for cooling the battery module 210. That is, when the refrigerant capacity is equal to or less than the set capacity, the controller 400 gives priority to battery fire safety so that the refrigerant is stored in the refrigerant storage 150.

Therefore, when the refrigerant of the air conditioner module 100 exceeds the set capacity, the controller 400 stores the refrigerant in the refrigerant storage 150 and performs air conditioning due to the driving in the air conditioner module 100. When the refrigerant of the air conditioner module 100 is equal to or less than the set capacity, the battery fire safety is prioritized so that the air conditioning function through the air conditioner module 100 is stopped and the refrigerant is stored in the refrigerant storage 150.

On the other hand, when the temperature of the battery module 210 is equal to or greater than the set temperature, the controller 400 controls the air conditioner module 100 to stop driving according to indoor cooling or indoor heating.

That is, the controller 400 determines that a fire has occurred in the battery module 210 if the temperature of the battery module 210 is equal to or greater than the set temperature, so that the indoor air conditioning and heating function according to the operation of the air conditioner module 100 is stopped, so that the extinguishing of the fire in the battery module 210 is performed by utilizing the refrigerant in the air conditioner module 100.

Accordingly, in an emergency such as a fire in the battery module 210, the fire in the battery module 210 can be actively suppressed by maximally using the refrigerant to extinguish the fire.

The controller 400 according to the embodiments of the present invention described above may perform the fire safety control of a mobility according to the flowchart shown in FIG. 8.

The fire safety system for a mobility having the structure as described above blocks the increase in activation energy of the electrochemical reaction by injecting the refrigerant in the air conditioner module in whole or in part in the battery module when a fire occurs in the battery, and maintains the temperature of the battery below an ignition point, so that the fire safety of the battery is secured by blocking the chain ignition through oxygen blocking.

Although the present invention has been shown and described with reference to specific embodiments, it will be obvious to those of ordinary skill in the art that the present invention can be variously improved and changed without departing from the spirit of the present invention provided by the following claims.

What is claimed is:

1. A fire safety system for a mobility, the fire safety system comprising:
    an air conditioner system comprising a compressor, a condenser, an expander, and an evaporator, wherein the air conditioner system is configured to circulate a refrigerant through the compressor, the condenser, the expander, and the evaporator;

a battery pack comprising a battery and a temperature sensor;
a refrigerant injector installed in the battery pack and coupled to the air conditioner system; and
a controller configured to control the refrigerant injector to selectively inject the refrigerant into the battery in response to a temperature of the battery measured by the temperature sensor being equal to or greater than a temperature threshold,
wherein the refrigerant injector comprises a refrigerant supply line extending from the battery inside the battery pack in the air conditioner system and an injector installed on the refrigerant supply line to match the battery and configured to be opened and closed according to control of the controller; and
wherein the injector comprises a cap part in communication with the refrigerant supply line, a sealing part filled in the cap part to seal the cap part and configured to melt at a specific temperature, and a heat generator provided in contact with the sealing part in the cap part and configured to, according to control of the controller, proactively generate heat to melt the sealing part in response to the temperature of the battery being equal to or greater than the temperature threshold.

2. The fire safety system according to claim 1, wherein the battery pack comprises:
an inner space in which the battery is provided; and
a discharge passage comprising an adjustment valve configured to selectively open and close the discharge passage to provide communication between the inner space and an outside.

3. The fire safety system according to claim 1, wherein:
the battery pack comprises a plurality of batteries and a plurality of temperature sensors;
the refrigerant supply line extends to pass through the batteries;
the injector is one of a plurality of the injectors, each injector being installed to match a respective battery; and
the controller is configured to control each injector to be opened when the respective battery has a temperature equal to or greater than the temperature threshold.

4. The fire safety system according to claim 1, wherein the refrigerant supply line is configured to be supplied with the refrigerant that has passed through the expander in the air conditioner system.

5. The fire safety system according to claim 1, wherein the controller is configured to control the air conditioner system to stop driving for indoor cooling or heating in response to the temperature of the battery being equal to or greater than the temperature threshold.

6. A method of operating a mobility that includes the fire safety system of claim 1, the method comprising:
measuring a temperature of the battery in the battery pack; and
controlling the refrigerant injector to selectively inject refrigerant from the air conditioner system into the battery in response to the temperature of the battery being equal to or greater than the temperature threshold.

7. The method according to claim 6, further comprising flowing the refrigerant through the compressor, the condenser, the expander, and the evaporator of the air conditioner system.

8. The method according to claim 6, further comprising supplying the refrigerant that has passed through the expander in the air conditioner system to the refrigerant supply line.

9. The method according to claim 6, wherein the air conditioner system further comprises a refrigerant storage, and wherein the method further comprises:
storing the refrigerant that has passed through the expander in the air conditioner system in the refrigerant storage; and
supplying the refrigerant stored in the refrigerant storage to the refrigerant supply line through the expander.

10. A first safety system for a mobility, the fire safety system comprising:
an air conditioner system comprising a compressor, a condenser, an expander, and an evaporator, wherein the air conditioner system is configured to circulate a refrigerant through the compressor, the condenser, the expander, and the evaporator;
a battery pack comprising a battery and a temperature sensor;
a refrigerant injector installed in the battery pack and coupled to the air conditioner system, wherein the refrigerant injector comprises a refrigerant supply line extending from the battery inside the battery pack in the air conditioner system;
a controller configured to control the refrigerant injector to selectively inject the refrigerant into the battery in response to a temperature of the battery measured by the temperature sensor being equal to or greater than a temperature threshold; and
an injector installed on the refrigerant supply line to match the battery and configured to be opened and closed according to control of the controller, wherein the injector comprises:
an opening part in the refrigerant supply line that opens toward the battery;
a bimetal part installed in the opening part to close the opening part and configured to be deformed in response to occurrence of a specific temperature to open the opening part; and
a heating part provided in contact with the bimetal part and configured to be heated according to the control of the controller to proactively generate heat to deform the bimetal part in response to the temperature of the battery being equal to or greater than the temperature threshold.

11. The fire safety system according to claim 10, wherein the battery pack comprises:
an inner space in which the battery is provided; and
a discharge passage comprising an adjustment valve configured to selectively open and close the discharge passage to provide communication between the inner space and an outside.

12. The fire safety system according to claim 10, wherein:
the battery pack comprises a plurality of batteries and a plurality of temperature sensors;
the refrigerant supply line extends to pass through the batteries;
the injector is one of a plurality of injectors, each injector being installed to match a respective battery; and
the controller is configured to control each injector to be opened when the respective battery has a temperature equal to or greater than the temperature threshold.

13. The fire safety system according to claim 10, wherein the refrigerant supply line is configured to be supplied with the refrigerant that has passed through the expander in the air conditioner system.

14. The fire safety system according to claim 10, wherein:
the air conditioner system further comprises a refrigerant storage;
the refrigerant that has passed through the expander in the air conditioner system is stored in the refrigerant storage; and
the refrigerant stored in the refrigerant storage is supplied to the refrigerant supply line through the expander in response to the control of the controller.

15. The fire safety system according to claim 14, wherein the controller is configured to receive a remaining amount of battery charge and control to allow the refrigerant to be stored in the refrigerant storage in the air conditioner system in response to the remaining amount of battery charge being equal to or greater than a set remaining amount.

16. The fire safety system according to claim 14, wherein:
the air conditioner system comprises a measurement device configured to check a refrigerant capacity; and
the controller is configured to receive information on the refrigerant capacity from the measurement device and to allow the refrigerant to be stored in the refrigerant storage in the air conditioner system in response to the refrigerant capacity being equal to or less than a set capacity.

17. The fire safety system according to claim 13, wherein the controller is configured to control the air conditioner system to stop driving for indoor cooling or heating in response to the temperature of the battery being equal to or greater than the temperature threshold.

18. A fire safety system for a mobility, the fire safety system comprising:
an air conditioner system comprising a compressor, a condenser, an expander, and an evaporator, wherein the air conditioner system is configured to circulate a refrigerant through the compressor, the condenser, the expander, and the evaporator;
a battery pack comprising a battery and a temperature sensor;
a refrigerant injector installed in the battery pack and coupled to the air conditioner system;
a refrigerant storage; and
a controller configured to control the refrigerant injector to selectively inject the refrigerant into the battery in response to a temperature of the battery measured by the temperature sensor being equal to or greater than a temperature threshold,
wherein the refrigerant injector comprises a refrigerant supply line extending from the battery inside the battery pack in the air conditioner system and an injector installed on the refrigerant supply line to match the battery and configured to be opened and closed according to control of the controller;
wherein the injector comprises a cap part in communication with the refrigerant supply line, a sealing part filled in the cap part to seal the cap part and configured to melt at a specific temperature, and a heat generator provided in contact with the sealing part in the cap part and configured to, according to control of the controller, proactively generate heat to melt the sealing part in response to the temperature of the battery being equal to or greater than the temperature threshold; and
wherein the refrigerant that has passed through the expander in the air conditioner system is stored in the refrigerant storage and the refrigerant stored in the refrigerant storage is supplied to the refrigerant supply line through the expander in response to the control of the controller.

19. The fire safety system according to claim 18, wherein the controller is configured to receive a remaining amount of battery charge and control to allow the refrigerant to be stored in the refrigerant storage in the air conditioner system in response to the remaining amount of battery charge being equal to or greater than a set remaining amount.

20. The fire safety system according to claim 18, wherein:
the air conditioner system comprises a measurement device configured to check a refrigerant capacity; and
the controller is configured to receive information on the refrigerant capacity from the measurement device and to allow the refrigerant to be stored in the refrigerant storage in the air conditioner system in response to the refrigerant capacity being equal to or less than a set capacity.

* * * * *

UNITED STATES PATENT AND TRADEMARK OFFICE
CERTIFICATE OF CORRECTION

PATENT NO. : 12,368,210 B2
APPLICATION NO. : 17/861410
DATED : July 22, 2025
INVENTOR(S) : Kim et al.

Page 1 of 1

It is certified that error appears in the above-identified patent and that said Letters Patent is hereby corrected as shown below:

In the Claims

In Column 9, in Claim 3, Line 39, delete "of the injectors," and insert -- of injectors, --.

Signed and Sealed this
Ninth Day of September, 2025

Coke Morgan Stewart
*Acting Director of the United States Patent and Trademark Office*